United States Patent [19]

Green

[11] 4,268,864
[45] May 19, 1981

[54] IMAGE ENHANCEMENT SYSTEM FOR TELEVISION

[75] Inventor: George R. J. Green, Trumbull, Conn.

[73] Assignee: CBS Inc., New York, N.Y.

[21] Appl. No.: 100,786

[22] Filed: Dec. 5, 1979

[51] Int. Cl.³ .............................................. H04N 5/14
[52] U.S. Cl. ................................................ 358/166
[58] Field of Search ....................... 358/166, 160, 167

[56] References Cited

U.S. PATENT DOCUMENTS 3,920,889  11/1975  Conner ................................. 358/166
4,091,420  5/1978  Omori et al. ......................... 358/166

OTHER PUBLICATIONS

"Improved Signal Processing Techniques for Color Television Broadcasting," R. H. McMann, Jr. et al., 1968 Journal SMPTE.

Primary Examiner—Richard Murray
Attorney, Agent, or Firm—Spencer E. Olson

[57] ABSTRACT

An image enhancement system for television wherein conventionally generated detail signals representative of variations in the amplitude of the video signal are further processed before being added to the video signal. A first fractional amplitude portion of the generated detail signal is amplified and then subjected to severe coring and the resulting bi-polar signal is combined with a second fractional amplitude portion of the generated detail signal to produce a resultant detail signal having a contour which reduces the width of the edging effect at contrast transitions associated with conventional enhancement systems, and in which high frequency noise and other spurious signals are substantially reduced while retaining fine detail to enhance key parts of the television picture.

9 Claims, 4 Drawing Figures

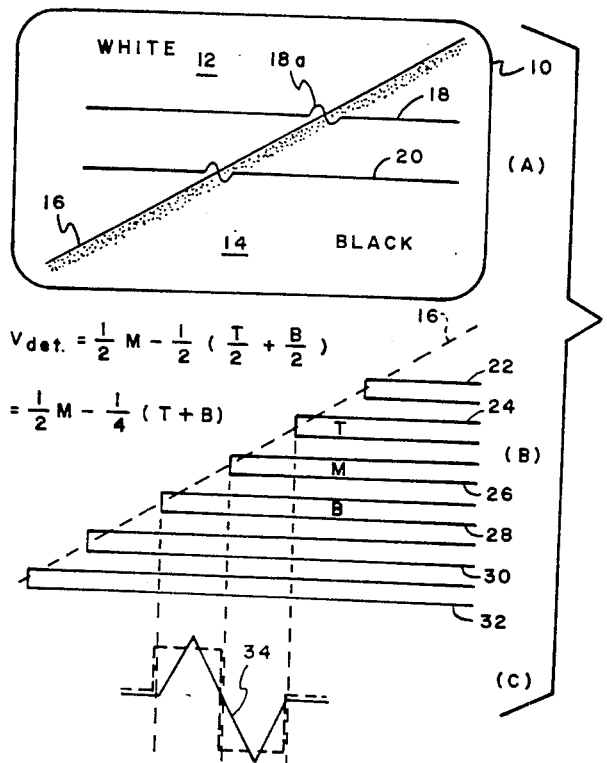
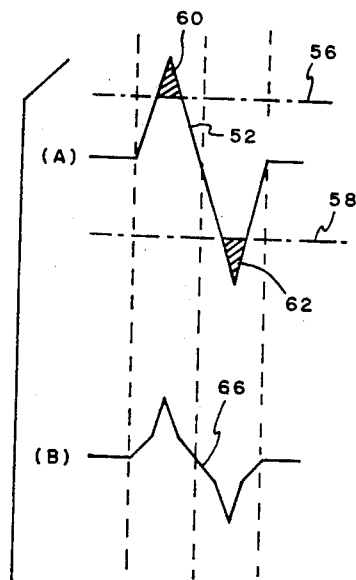
Fig. 1
PRIOR ART
Fig. 3

IMAGE ENHANCEMENT SYSTEM FOR TELEVISION

BACKGROUND OF THE INVENTION

This invention relates to television and, more particularly, to method and apparatus for enhancing the sharpness of reproduced television pictures.

The reproduction of geometrical details is an important and much-investigated problem in television. In the transmission and reproduction of television images a distortion known as aperture distortion arises due to the fact that the electron beam of a television camera produces a scanning spot of finite size. As a consequence of the response of a television camera to the average light intensity within an image area covered by a scanning spot at any instant, the sharpness of image borderlines of high contrast is reduced. Such aperture distortion has two components, a horizontal component caused by the finite spot size in the horizontal direction (the line direction), and a vertical component caused by the finite spot size in the vertical direction (the field direction). There have previously been devised useful aperture correction circuits, of various types, which compensate a derived television information signal for this "spread" of information. One such system, described in an article entitled "Improved Signal Processing Techniques For Color Television Broadcasting" by R. H. McMann, Jr. and A. A. Goldberg which appeared in the March 1968 issue of the Journal of the SMPTE, provides both horizontal and vertical aperture correction by generating both horizontal and vertical detail signals which are combined and added to the video signal to produce a video signal of enhanced sharpness content. To generate the horizontal detail signal, each element of picture information on a scan line is compared to the adjacent picture elements occurring before and after the element being acted upon. Since the video signal appears sequentially in time, it is necessary to store video information for periods equal to the duration of one and two picture elements, typically, about 150 and 300 nanoseconds. Using delay lines with appropriate delay, signals known as "left", "main" and "right" signals are formed, which when combined in judicious manner produce horizontal detail signals that are ultimately added to a delayed version of the video signal to produce a resultant video signal of enhanced horizontal resolution. Vertical detail signals are generated by an analogous technique wherein a single scan line of video is compared element-by-element with the scan lines immediately preceding and following it. In this case, it is necessary to store video information for periods equal to the duration of one and two horizontal scan lines; i.e., 63.55 microseconds and 127.10 microseconds, respectively, for NTSC television. Comparison of successive scan lines produce "top", "main" and "bottom" signals which are combined in predetermined proportions to produce vertical detail signals that are also ultimately added to delayed original video. The thus-produced horizontal and vertical detail signals are usually added or otherwise combined before being added to the original video and are generically referred to as "detail signals". These signals are added back onto the original signal in such a phase as to emphasize the difference between the lines compared, in the case of vertical enhancement, thus enhancing vertical transitions, and to emphasize the difference between the picture elements compared, in the case of horizontal correction, thus enhancing horizontal transitions. The amount of vertical and horizontal aperture compensation added to a particular television signal can be varied by controlling the overall magnitude of the detail signals added back onto the original video signal.

While the described system of image enhancement has, with only minor modification, been used up to the present with generally acceptable results, it has the drawback that the baseline clipper included in the enhancement path to avoid enhancement of noise, removes low amplitude detail signals as well. This is not all bad, however, because facial blemishes and background wall texture, are not enhanced while important picture lines that the program should convey, such as eyes, teeth and hair highlights, are enhanced. A more serious drawback of this prior system arises from the nature of the television picture; because it consists of interlaced fields the correction signals are not derived from adjacent, but, rather, from alternate picture lines. This results in pre-shoot and overshoot of the detail signals during transitions from black-to-white or from white-to-black which cause a visible transition zone on the screen giving the appearance that objects are surrounded with black and white margins of objectionable width, giving the picture an unnatural look. This "edging" is particularly objectionable since its width tends to be constant and, accordingly, more pronounced. if the image it surrounds is small. This is visually disturbing in situations where the camera is zoomed back from an object which has "edging" in that the object becomes smaller while the width of the "edging" stays approximately the same.

SUMMARY OF THE INVENTION

One object of the present invention is to provide apparatus for generating detail signals which when added to the input video signal minimizes the visually objectionable "edge" effect. Another object of the present invention is to provide an image enhancement system which significantly reduces noise in the detail signal while retaining sufficient detail to enhance key parts of the television picture. Yet another object of the invention is to provide an image enhancement system which differentiates between high and low contrast detail.

The image enhancer of the present invention accomplishes the foregoing objects by generating horizontal and vertical detail signals representative of variations in the amplitude of the video signal, adding the horizontal and vertical detail signals to produce a composite detail signal, amplifying a first fractional amplitude portion of the detail signal and severely coring the amplified signal by baseline clipping, adding the clipped signal to a second fractional amplitude portion of the generated detail signal, and adding the thus-derived detail signal to the delayed original video. Thus, a portion of the original detail signal is not subjected to coring, and although as a consequence a portion of the noise contained in the generated detail signal is retained, the ultimate result is that when the cored portion of the detail signal is added to the other unprocessed fractional amplitude portion, the resultant detail signal contains low level detail, albeit reduced, with still a significant reduction in noise. The duration of the higher amplitude portion of the derived detail signal is less than the duration of the corresponding portion of the generated detail signal so as to have a more delicate contour and achieves a noticeable reduction of the width of edging at high contrast transitions. As compared to conventional image enhancers wherein a coring technique is utilized to reduce noise, at the expense, however, of also eliminating low contrast detail, an undesirable result, the present system achieves a reduction in noise while retaining a significant amount of low contrast detail.

BRIEF DESCRIPTION OF THE DRAWINGS

Other objects, features and advantages of the invention will become apparent, and its construction and operation better understood, from the following detailed description, taken in conjunction with the accompanying drawings, in which:

FIG. 1 is an illustration of the principle of conventional video enhancement with detail signals;

FIG. 3 is a waveform diagram of signals at various points in the apparatus of FIG. 2.

DESCRIPTION OF THE PREFERRED EMBODIMENT

Figure 2:
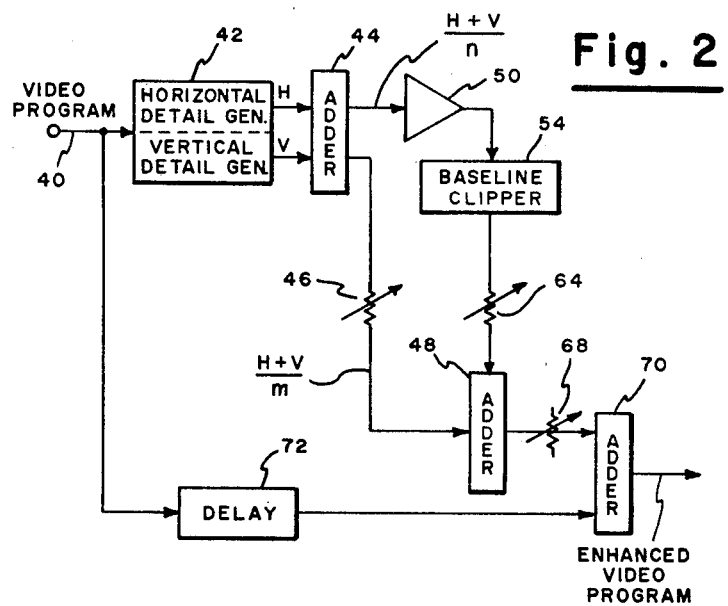
FIG. 2 is a block diagram of the preferred embodiment of the invention.

To better understand the enhanced sharpness achievable with the detail signal generator described in the above-mentioned SMPTE article, and the shortcomings thereof, reference is made to the simplified illustration of FIG. 1(A) wherein there is shown a television scene 10 consisting of a white area 12 and a black area 14, with the transition from white-to-black occurring along a diagonal line 16. Superimposed on the screen are individual line traces 18 and 20 which represent the detail signals corresponding to two selected scan lines of a video display signal which form part of the display. It is seen that for this particular display pattern, the detail signal generally has zero amplitude except at positions on the screen corresponding to transitions from white-to-black. For example, examining the trace 18 from left to right, it is seen that a detail signal 18a is formed at the white-to-black transition, which consists of a short duration positive-going pulse followed immediately by a negative-going pulse of substantially the same duration. Although not illustrated in FIG. 1, the detail signal generated at a black-to-white transition would consist of a negative-going short duration pulse followed by a positive-going pulse of substantially the same duration. Because of the finite size of the beam of the camera tube, and the separation of the successive lines that are combined to generate the detail signal, when the detail signal is combined with the video a broadening of the transition between white and black occurs, with the area immediately proceeding the transition being whiter-than-white and the region following the transition being blacker-than-black. The width of this undesirable "edging" is substantially constant with changes in the size of the image, primarily because of the vertical detail signal.

The reason for the edging at transitions will be evident from FIG. 1(B) which shows greatly enlarged a plurality of successive scan lines 22-32 which, in conventional detail signal generators, are field scanlines and thus are separated by approximately the width of a scanline. Since no detail signals are generated by the white background 12, the scan lines are shown as commencing at the transition line 16. Vertical detail signals are conventionally generated by comparing successive scan lines "T", "M" and "B" and subtracting one-fourth of the sum of the "T" and "B" signals from one-half the "M" signal; that is, $V_{det} = \frac{1}{2} M - \frac{1}{4} (T+B)$. It will be evident that if there is no change from line-to-line on these three lines, that is, no information difference, no detail signal will be generated. However, if, as in the illustration, there is an information change from line-to-line, a vertical detail signal is generated, the character of which will depend on the nature of the information changes. Considering that the generated detail signal is always for the "M" line at any moment in time, it will be noted that there is a white area immediately above it and that in scanline "B", the line below the "M" line, there is a black area. The resulting detail signal, therefore, shown in idealized form by the dotted line waveform in FIG. 1(C), is a positive-going rectangular pulse having a duration corresponding to the time difference between the commencement of lines "M" and line "B", followed by a negative-going rectangular pulse of substantially the same duration. When this signal is added to line 37 M", it gest whiter-than-white just before the transition and it gets blacker-than-black just after the transition, to provide enhancement. In actual practice, of course, the detail signal does not have a rectangular waveform but, rather, is somewhat rounded; although also somewhat idealized for clarity of illustration of the invention, the triangular waveform 34 more nearly depicts the shape of the generated vertical detail signals. Horizontal detail signals generated by the method described in the SMPTE article have a similar waveform. It is the relatively large width of the positive- and negative-going excursions of the vertical detail signal that causes the edging effect when the detail signal is added to the input video signal.

Figure 2A:
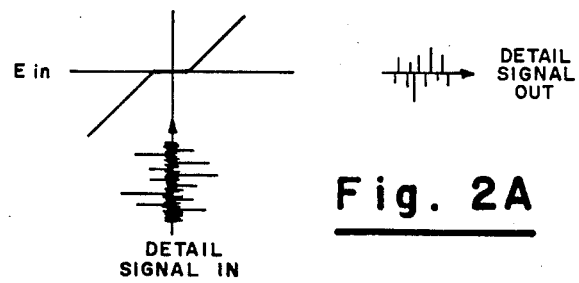
FIG. 2A illustrates the transfer function of the baseline clipper of the system of FIG. 2.

Reduction of the width of the undesirable edging, and other advantages, are achieved according to the present invention by processing conventionally generated horizontal and vertical detail signals in such a way as to produce detail signals having a more delicately shaped contour. In the embodiment of the invention shown in FIG. 2, input program video signals conducted in a channel 40 are supplied to a detail signal generator 42 which includes a horizontal detail generator and a vertical detail generator. Suitable horizontal and vertical detail generators are described in the aforementioned SMPTE article by R. M. McMann Jr., and A. A. Goldberg, and may be as embodied in commercial image enhancers, such as the early CBS Image Enhancer. The horizontal (H) and vertical (V) detail signals respectively generated by the horizontal and vertical generators are combined in an adder 44 to produce a conventional detail signal which, for purposes of the discussion to follow, ideally has a shape corresponding generally to waveform 34. A first fractional amplitude portion of the generated detail signal, $(H+V)/m$, where m is adjustable by a variable gain device represented by a variable resistance 46, is applied as one input to a second adder 48. This portion of the detail signal consists of positive and negative H and V detail pulse signals from adder 44, plus spurious signals due to noise and stationary patterns such as target blemishes, on the center average baseline. A second fractional amplitude portion of the detail signal from adder 44, $(H+V)/n$, which also includes spurious noise signals and stationary patterns such as blemishes, is amplified by an amplifier 50 to produce at its output a signal represented by the idealized waveform 52 in FIG. 3A. Typically, amplifier 50 has a voltage gain of ten or more so as signifcantly to "stretch" the signal in both the positive and negative directions. The amplified detail signal (the spurious signals of which are, of course, also amplified) is applied to a conventional baseline clipper circuit 54 having a transfer function as illustrated in FIG. 2A and the positive and negative threshold levels 56 and 58, respectively, shown in FIG. 3A. The thresholds are selected to cause severe "coring" of the applied signal; that is, that the portion of the signal between threshold levels 56 and 58 is "cored out" so as to leave a truncated bipolar signal, represented by the shaded areas 60 and 62 in FIG. 3A. It is significant to note that the width of the shaded areas is significantly less than the width of the original detail signal 34. Typically, the threshold levels are set to "core out" approximately 90% of the amplified detail signal, a much more severe "coring" than that employed in the SMPTE system, or in other image enhancers utilizing baseline clipping. This extreme "coring" of the amplified detail signal eliminates substantially all of the spurious noise signals, and low level fine detail signals as well.

The bi-polar signal represented by the shaded areas in FIG. 3A is amplified or attenuated, as necessary, in a device schematically represented by the variable resistor 64, and applied as a second input to adder 48 for addition to the unprocessed (H+V)/m signal. By way of example, but not limitation, approximately equal amplitude parts of the unprocessed and processed detail signals are added together to produce a modified signal, shown in idealized form by waveform 66 in FIG. 3B. It is seen that the positive- and negative-going portions of the resultant signal in the zero level region have the same width as the unprocessed detail signal, but that the duration of the higher amplitude portions (both positive and negative) is significantly less than corresponding amplitude portions of the original detail signal 34. The noise in the corrected detail signal is significantly reduced, yet contains enhanced low level detail, albeit reduced by half. That is, spurious noise and low level detail signals are retained in the unprocessed half of the original detail signal, but are essentially eliminated by the baseline clipper in the processed half. As a result of a half and half mix, the corrected signal still contains enhanced low level detail, albeit reduced by 6 dB, with a corresponding reduction in the amount of noise present in the original detail signal, and at the same time has a more delicate waveform so as to reduce the width of edging that otherwise occurs along contrast transitions.

Summarizing, the system according to the invention, utilizing approximately a half and half amplitude mix of processed and unprocessed detail signal, provides (for a detail signal of the same amplitude) a reduction of approximately 3 dB in noise over the conventional detail signal while still retaining the low level detail information. (Conventional enhancers typically utilize coring to effect a 3 dB noise reduction which, however, also eliminates the low level detail information.) Additionally, the system provides a more delicately contoured detail signal for high level detail information thereby to reduce the gross edge effects typical in conventional enhancers. The described mixing of processed and unprocessed detail signal allows the system automatically to differentiate between high and low contrast information; that is, for high contrast edges the amplitude of the detail signal is the same as in conventionally generated detail signals, but low level detail information is reduced in amplitude by 6 dB. Such reduction of low level detail has the advantage that facial texture does not get the overenhanced look typical of conventional enhancement. Critical observers consider the picture to be more acceptable when enhancement is heavier on large contrast transitions than on small contrast transitions, that is, that enhancement should not be linear but, rather, should change with the degree of contrast at transitions in the picture; this result is automatically achieved with the present system. It being a matter of subjective taste as to how much fine detail should be included in the modified detail signal, the relative proportions of processed and unprocessed detail signal to be combined in adder 48 is subject to considerable latitude.

The modified detail signal appearing at the output of adder 48 is applied through an amplitude-adjusting device, schematically shown as a potentiometer 68, as one input to a third summing circuit 70 in which it is added onto the input program delayed by delay means 72 by an amount to compensate for the delay introduced by the detail generating system, to produce an enhanced video program signal at the output of adder 70. The potentiometer 68 provides adjustability of the amplitude of the modified detail signal added to the program video for controlling the amount of enhancement.

While a particular embodiment of the present invention has been shown and described in detail, adaptations and modifications will be apparent to one skilled in the art. Such adaptations and modifications of the invention may be made without departing from the spirit and scope thereof, as set forth in the claims.

I claim:

1. Apparatus for producing modified detail signals from a video signal, comprising:
   means for generating detail signals representative of variations in the amplitude of said video signal;
   means for amplifying a first fractional amplitude portion of said generated detail signals;
   coring means for truncating a major portion of the amplified signal produced by said amplifying means; and
   means for adding a selected fractional amplitude portion of the signal produced by said coring means to a selected fractional amplitude portion of said generated detail signals to produce said modified detail signal.

2. Apparatus according to claim 1, wherein said coring means is a baseline clipper for producing a bi-polar signal substantially devoid of noise and low contrast detail signals, half-cycles of which have a duration substantially shorter than that of half-cycles of the generated detail signals.

3. Apparatus according to claim 2, wherein said coring means is a baseline clipper adapted to truncate approximately 90% of the amplified signal produced by said amplifying means.

4. Apparatus according to claim 2 or claim 3, wherein said adding means adds together approximately equal amplitude parts of said bi-polar signals and said generated detail signals to produce said modified detail signal.

5. Apparatus for receiving an input video signal and producing an enhanced video signal, said apparatus comprising:
   means for generating detail signals representative of variations in the amplitude of said input video signal;
   means for amplifying a first fractional amplitude portion of said generated detail signals;
   coring means for truncating a major portion of the amplified signal produced by said amplifying means and producing a bi-polar signal substantially devoid of noise and low contrast detail signals, half-cycles of which have a duration substantially shorter than that of half-cycles of said generated detail signals;

means for adding together approximately equal amplitude portions of said bi-polar signal and said generated detail signals to produce modified detail signals;

means for delaying said input video signal; and means for adding said modified detail signals to the delayed input video signals to produce said enhanced video signal.

6. Apparatus according to claim 5, wherein said coring means is a baseline clipper.

7. Apparatus according to claim 6, wherein said baseline clipper is adapted to truncate approximately 90% of the amplified signal produced by said amplifying means.

8. Method of producing modified detail signals from a video signal, comprising the steps of:

generating detail signals representative of variations in the amplitude of said video signal, amplifying a first fractional amplitude portion of the generated detail signals, severely coring said amplified first fractional amplitude portion to produce a bi-polar signal substantially devoid of noise and low contrast detail signals, half-cycles of which have a duration substantially shorter than that of half-cycles of the generated detail signals, and adding together approximately equal amplitude parts of said bi-polar signal and said generated detail signals to produce modified detail signals.

9. Method according to claim 8, wherein in said coring step approximately 90% of the amplified signal produced by said amplifying means is eliminated.

* * * * *